No. 673,461. Patented May 7, 1901.
W. B. THOMSON.
PANORAMIC CAMERA.
(Application filed Sept. 2, 1899.)

(No Model.) 2 Sheets—Sheet 1.

Witnesses:
Chas. O. Shervey
S. Bliss

Inventor
William B. Thomson,
by Wilkinson & Bitner
Attys.

THE NORRIS PETERS CO., PHOTO-LITHO., WASHINGTON, D. C.

No. 673,461. Patented May 7, 1901.
W. B. THOMSON.
PANORAMIC CAMERA.
(Application filed Sept. 2, 1899.)
(No Model.) 2 Sheets—Sheet 2.
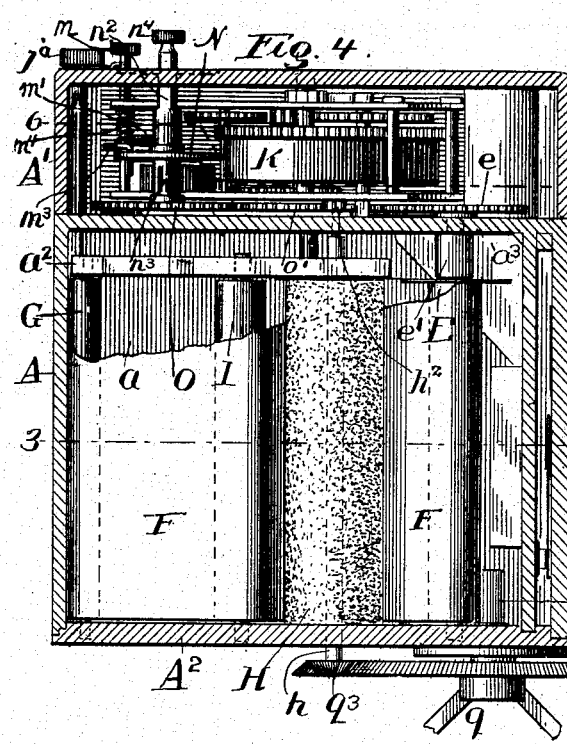
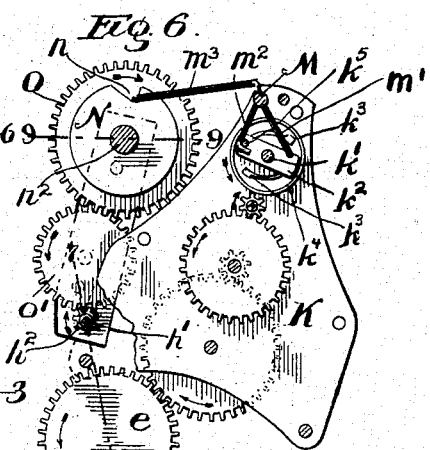
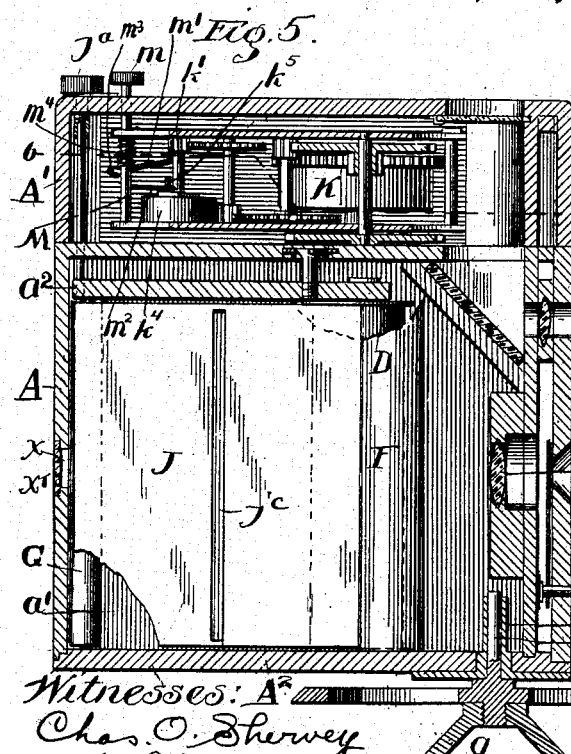
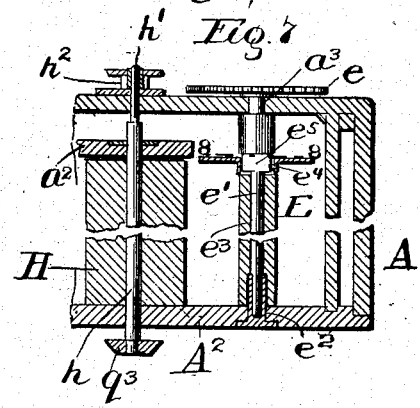
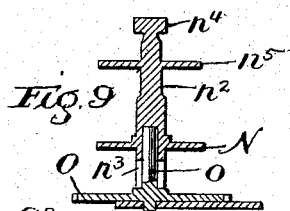
Witnesses:
Chas. O. Shervey
S. Bliss.
Inventor:
William B. Thomson
by Miles Moore & Ritter
Attys.

UNITED STATES PATENT OFFICE.

WILLIAM B. THOMSON, OF CHICAGO, ILLINOIS, ASSIGNOR TO R. H. TRUMBULL, OF SAME PLACE.

PANORAMIC CAMERA.

SPECIFICATION forming part of Letters Patent No. 673,461, dated May 7, 1901.

Application filed September 2, 1899. Serial No. 729,275. (No model.)

*To all whom it may concern:*

Be it known that I, WILLIAM B. THOMSON, a citizen of the United States of America, residing at Chicago, in the county of Cook and State of Illinois, have invented certain new and useful Improvements in Photographic Cameras, of which the following is a specification.

My invention relates to certain improvements in photographic cameras designed for the purpose of providing means for taking panoramic and cycloramic views of the objects and scenery surrounding any given position in which the camera may be placed.

It is the purpose of the invention to so construct a camera that a series of such views may be taken upon a continuous film positively advanced by suitable mechanism, which also operates the camera to sweep it around to bring the various objects in focus.

It is also the purpose of the invention to so construct the camera that it may be used in the manner of the ordinary photographic camera and by a slight adjustment may be changed into a panoramic camera, and vice versa, enabling a series of ordinary views or a series of panoramic views or a series of alternating views to be taken upon the same film.

These objects and purposes and others are attained by means of certain mechanism containing novel characteristics or features which will be clearly set forth in the following description and the essential elements of which will be pointed out in the appended claims.

Figure 1:
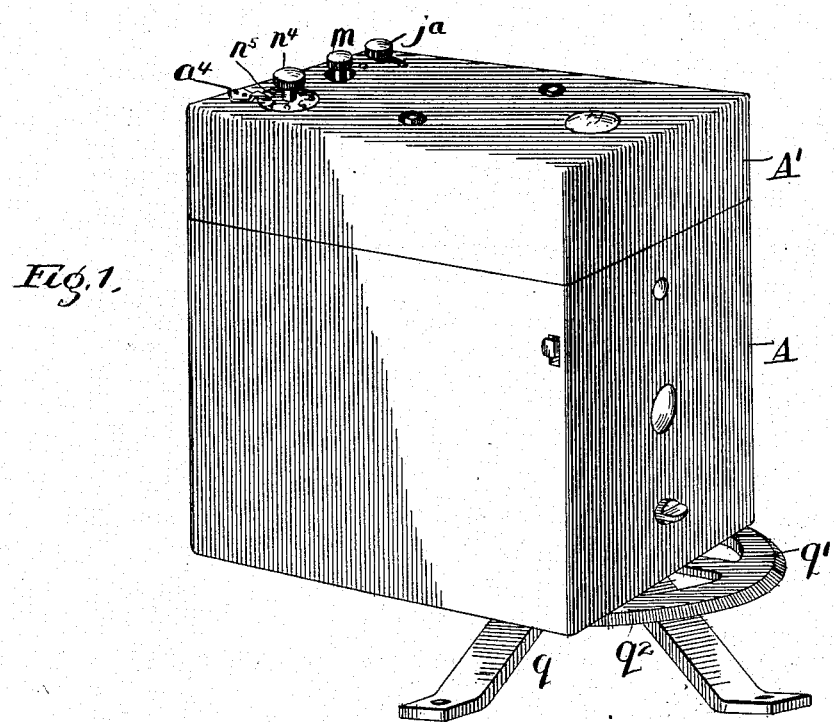
Figure 2:
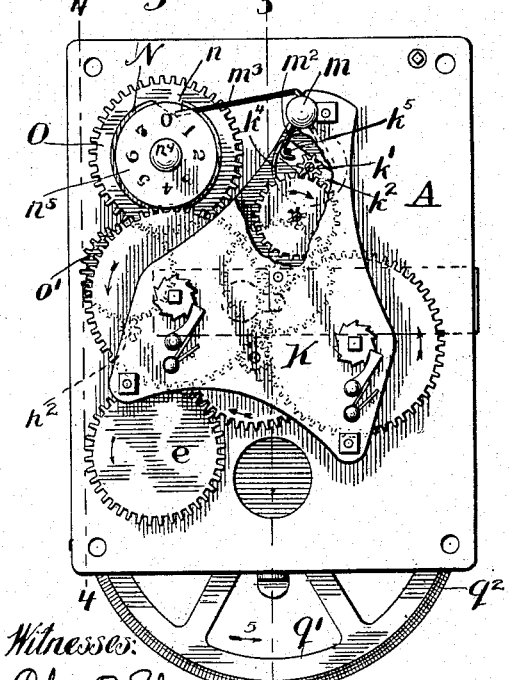
Figure 3:
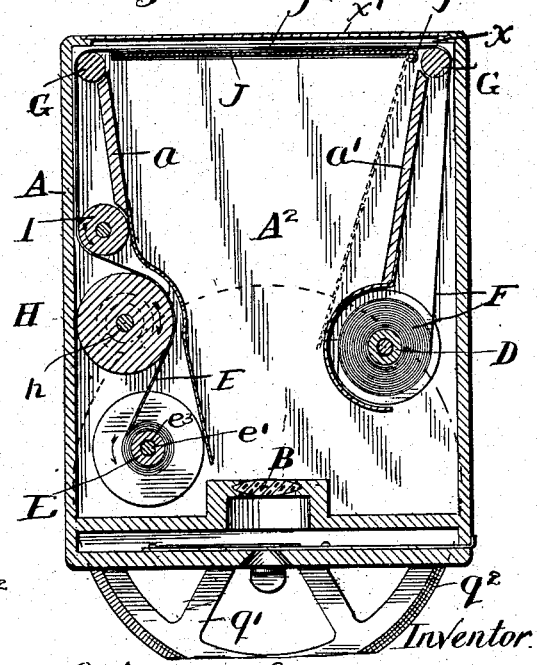

In the drawings, Figure 1 is a perspective of a complete camera mounted in position upon its turn-table. Fig. 2 is a plan of the same with the top cover removed. Fig. 3 is a horizontal section in line 3 3 of Fig. 4. Fig. 4 is a vertical section in line 4 4 of Fig. 2. Fig. 5 is a vertical section in line 5 5 of Fig. 2 looking in the direction of the arrow 5. Fig. 6 is a detail plan of the end portion of the clockwork, disclosed by cutting away the upper portion in the plane 6 6 of Figs. 4 and 5 and breaking away one corner of the bottom plate of the clock-movement. Fig. 7 is a vertical section in line 7 7 of Fig. 6. Fig. 8 is a horizontal detail section in line 8 8 of Fig. 7, and Fig. 9 is a detail vertical section in line 9 9 of Fig. 6.

Referring to the drawings, A is the camera-box, shown as the ordinary rectangular form and having upon the top a cover A′, forming an upward extension, in which is accommodated certain spring-actuated clockwork adapted to operate the camera.

The bottom $A^2$ (see Figs. 4 and 5) is removable and carries two upwardly-extending wings $a\ a'$, upon the top of which is a horizontal partition $a^2$, (see Figs. 4 and 5,) making the framework upon which is carried the film-supporting devices and the devices for adjusting the camera for use either in the taking of the ordinary photographic views or the panoramic or cycloramic.

Looking at Fig. 3 two spools D E will be seen mounted upon upright axes and carrying a film F, which passes about antifriction-rollers G G at the rear corners of the camera, and passes between two rollers H I upon the left-hand side in the drawings. The spool D is the loose spool and the spool E is geared positively to the working mechanism to wind up the film. The roller H is a friction-roller bearing upon the film and geared to both rotate the camera and operate a stop to check the clock-movement at the proper time. A slotted gate or film cover J is hinged at $j$ upon a vertical rod provided with a head $j^a$ (see Fig. 1) for operating it from without the case, so as to swing it from the position seen in Fig. 3 in full lines to that shown in dotted lines. In the former position a vertical slot $j^c$ is the only opening through which the light from the lens can reach the film. In the latter position the entire rear portion of the film is exposed to the light, as in the ordinary camera. When the shutter is thrown forward, as seen in dotted lines, the camera may be used in the ordinary manner to take a series of views one after the other of such objects as may be in range at the time of exposure. When the shutter is thrown back, however, exposing the film only through the slot, the camera may be rotated and the film simultaneously advanced to take successively all of the objects surrounding the point at which the camera is located.

Looking at Fig. 2 a clock-movement K will be seen provided with suitable springs, winding devices, and train of gears, which are of common form and not necessary to describe, but the object of which is to rotate a spool-winding gear $e$ to wind up the film upon the spool E. This gear $e$ is fast upon a spindle $e'$, (see Fig. 7,) journaled at the top in the top of the box proper, which is seen at $a^3$ in Figs. 4, 5, and 7, and at the bottom in a socket $e^2$, secured in the bottom $A^2$ of the box. It should be noticed in Fig. 7 that the bottom of the spindle $e'$ can be lifted from the socket $e^2$ in removing the bottom from the box to remove or replace the film. The spool E, which winds up the film, is provided with a central bore $e^3$ to receive the spindle $e'$ and at the top with radially-extending slots $e^4$ to receive a winged portion $e^5$ of the spindle, which prevents rotation of the spool upon the latter. The train of gears of the movement K also rotates a spindle $k'$, (see Figs. 2, 5, and 6,) bearing a cross-bar $k^2$, carrying two spring brake-shoes $k^3$, located within a stationary drum $k^4$. The cross-bar also has a pin $k^5$, by means of which the movement may be absolutely checked. The spring brake-shoes limit the speed of the movement by coming into frictional contact with the inside of the drum when the velocity is such as to overcome their elasticity by the centrifugal force.

A spindle M (see Figs. 5 and 6) is pivoted in the clock-movement, extending above the top cover in the form of a button $m$. This spindle carries three horizontal arms $m'$ $m^2$ $m^3$. The arm $m'$ is adapted by frictional contact with the spindle to provide means for preventing the movement of the clockwork by means of the button $m$. The arm $m^2$ has a horizontal hooked end adapted to engage the pin $k^5$, and the arm $m^3$ has a downturned end adapted to enter a notch $n$ in a stop-plate N, to be described below. A spring $m^4$ (see Fig. 5) tends to keep the arm $m^2$ hooked over the pin and the arm $m^3$ in the notch, thus tending to prevent the movement of the clockwork when in this position and to stop such movement whenever permitted to return thereto. The disk N is adapted to hold the arm $m^3$ to prevent engagement of the arm $m^2$ with the pin whenever the notch in the disk is moved away from the downturned end of said arms $m^3$. Said disk is fast upon a post $n^2$, mounted upon a spindle $o$ (see Fig. 9) of the gear O, (see Fig. 6,) rotated by an intermediate gear $o'$ and a pinion $h^2$, turned by the squared upper end $h'$ of a shaft $h$, secured against rotation in the friction-roller H. The pinion $h^2$ is journaled in the lower plate of the clock-movement, as seen in Fig. 7, so that the squared end of the shaft may be drawn from it in taking the film-carrying devices from the box. The post $n^2$ fits over the spindle $o$ (see Fig. 9) by means of a split spring-socket $n^3$, the friction between the two parts being sufficient to enable the spindle to rotate the post, but the parts being loose enough to permit the independent rotation of the post by hand to set the stop-disk N in any desired position. At the top of the post is a button $n^4$, adapted to be rotated by hand, and between this button and the stop-disk is a dial-disk $n^5$, arranged to be substantially flush with the top of the cover, as seen in Fig. 1, said dial-disk being preferably provided with a series of figures around its outer margin, marking the desired fractions of its circumference, and the cover is provided with a pointer $a^4$, located at the zero-mark of the scale. In the bottom of the case and in the vertical line of the lens B is a socket P, (see Fig. 5,) fitted to which is a pin Q, rising from a standard $q$ and bearing a horizontal friction-gear $q'$, provided with a knurled beveled edge $q^2$. The shaft $h$ of the friction-roller H extends through the bottom of the box and bears a horizontal friction-pinion $q^3$, also provided with a knurled edge beveled oppositely to that of the gear $q'$ and adapted to travel around said gear when the friction-roller is rotated by the film.

The roller H and the gears $q'$ $q^3$ are so proportioned that a given movement of the film will swing the case sufficiently to carry the point of exposure through a distance equal to such movement, thus presenting fresh film to the various objects brought successively into range. The gears O $o'$ $h^2$ (see Fig. 6) are preferably so proportioned as to make the dial $n^5$ turn once with each rotation of the camera.

In the rear side of the box is a horizontal slot (see $x$, Figs. 3 and 5) covered by a red glass $x'$ to expose the numbers upon the back of the film-cover. The slot is an advantage over the ordinary round opening in the center of the back, because in taking the panoramic views the end of the film should be started opposite the vertical slot in the swinging film-cover J; otherwise the portion which passes this slot will be wasted.

In the use of the camera for ordinary views the operation is exactly the same as that of the ordinary form except that the film is advanced by turning the button $m$ to start the clockwork. When the film reaches the desired point, the button is released and the film is checked.

In the panoramic use of the camera the button $n^4$ is turned toward the right through an angle equal to that of the proposed view and released simultaneously with the opening of the shutter. The turning of the button releases the clockwork, and the camera is rotated and the film advanced until the predetermined angle has been completed, when the movement is automatically checked, and the shutter should be closed simultaneously therewith.

I recognize the possibility of great variation in form and arrangement of the parts above described, and I do not therefore limit myself to the specific construction shown.

I claim as new and desire to secure by Letters Patent—

1. The combination with a rotatable camera pivoted in line with the lens center and containing a slotted film-cover, of a pair of film-holding spools, guides for carrying the film behind the slot, gearing for rotating the camera, gearing for winding up the film upon one of the spools to advance it behind the slot, a motor connected with the rotating gear and the film-advancing gear and stop device to check the motor, a notched disk slippingly supported on the gear and rotated thereby, said disk being adapted to actuate the stop device and an external dial connected with the disk and having a predetermined relation to the notch; substantially as described.

2. The combination with a rotatable camera provided with suitable film holding and exposing devices, of a motor adapted to operate the same, an automatic stop therefor and a hand-operated stop therefor, the operation of the hand-operated stop serving to release the automatic stop for setting; substantially as described.

3. The combination with a rotatable camera provided with suitable film holding and advancing devices, of a substantially rigid swinging door pivoted transversely to the lens-axis and swinging from a position in front of the exposed portion of the film to a position away from between said portion and the lens, said door being slotted transversely to the line of motion of the film; substantially as described.

In witness whereof I have hereunto set my hand at Chicago, in the county of Cook and State of Illinois, this 29th day of August, A. D. 1899.

WILLIAM B. THOMSON.

Witnesses:
CHAS. O. SHERVEY,
H. BITNER.